(12) United States Patent
Arkwright et al.

(10) Patent No.: US 9,459,164 B2
(45) Date of Patent: Oct. 4, 2016

(54) OPTICAL SENSING APPARATUS INCLUDING HOLDER FOR HOLDING FIRST AND SECOND OPTICAL FIBRE PORTIONS

(71) Applicant: COMMONWEALTH SCIENTIFIC AND INDUSTRIAL RESEARCH ORGANIZATION, Campbell, Australian Capital Territory (AU)

(72) Inventors: John William Arkwright, Ryde (AU); Simon Adam Maunder, Baulkham Hills (AU); Hsiao-Chuan Wang, Chatswood (AU)

(73) Assignee: COMMONWEALTH SCIENTIFIC AND INDUSTRIAL RESEARCH ORGANISATION, Campbell (AU)

( * ) Notice: Subject to any disclaimer, the term of this patent is extended or adjusted under 35 U.S.C. 154(b) by 125 days.

(21) Appl. No.: 14/357,895
(22) PCT Filed: Nov. 14, 2012
(86) PCT No.: PCT/AU2012/001406
§ 371 (c)(1),
(2) Date: May 13, 2014
(87) PCT Pub. No.: WO2013/071351
PCT Pub. Date: May 23, 2013

(65) Prior Publication Data
US 2014/0326078 A1    Nov. 6, 2014

(30) Foreign Application Priority Data
Nov. 14, 2011   (AU) ............................. 2011904736

(51) Int. Cl.
*G01J 1/04*     (2006.01)
*G01L 1/24*     (2006.01)
*G01K 11/32*    (2006.01)
*G01D 5/353*    (2006.01)

(52) U.S. Cl.
CPC ........... *G01L 1/246* (2013.01); *G01D 5/35316* (2013.01); *G01D 5/35374* (2013.01); *G01K 11/3206* (2013.01)

(58) Field of Classification Search
CPC ................. G01K 11/3206; G01D 5/35374; G01D 5/35316
USPC ..................................................... 250/227.14
See application file for complete search history.

(56) References Cited

U.S. PATENT DOCUMENTS

| 4,959,539 A | 9/1990 | Hofler et al. |
| 2003/0072515 A1* | 4/2003 | Ames et al. ............ 385/13 |

(Continued)

FOREIGN PATENT DOCUMENTS

| DE | 19630181 | 1/1998 |
| WO | 2004/009957 A1 | 1/2004 |
| WO | 2009/111827 | 9/2009 |

OTHER PUBLICATIONS

International Search Report for PCT/AU2012/001406 dated Jan. 2, 2013.
Supplementary European Search Report issued Jul. 21, 2015 in corresponding European Patent Application No. 12850100.4.

*Primary Examiner* — Thanh Luu
(74) *Attorney, Agent, or Firm* — Sughrue Mion, PLLC

(57) ABSTRACT

The present disclosure provides an optical sensing apparatus for measuring a change in a first property. The optical sensing apparatus comprises first and second optical fibre portions and a sensing region for exposing both the first and second optical fibre portions to a change in an applied force. The force is, or is related to, the first property and has a component that is transversal to the optical fibre portions. The apparatus further comprises a holder for holding the first and second optical fibre portions in the sensing region. The first and second optical fibre portions are arranged relative to each other such that the change in the force results in a first change of an optical property of the first optical fibre portion and in a second change of the optical property of the second optical fibre portion and wherein the first change differs from the second change.

13 Claims, 7 Drawing Sheets

(56) References Cited

U.S. PATENT DOCUMENTS

2005/0274194 A1 12/2005 Skinner et al.
2009/0177095 A1 7/2009 Aeby et al.
2010/0287906 A1* 11/2010 Xia et al. .................. 60/39.091
2011/0116743 A1* 5/2011 Arkwright et al. ............ 385/37

* cited by examiner

OPTICAL SENSING APPARATUS INCLUDING HOLDER FOR HOLDING FIRST AND SECOND OPTICAL FIBRE PORTIONS

CROSS REFERENCE TO RELATED APPLICATIONS

This application is a National Stage of International Application No. PCT/AU2012/001406 filed Nov. 14, 2012, claiming priority based on Australian Patent Application No. 2011904736 filed Nov. 14, 2011, the contents of all of which are incorporated herein by reference in their entirety.

FIELD OF THE INVENTION

The present invention broadly relates to an optical sensing apparatus and relates particularly, though not exclusively, to an optical sensing apparatus for measuring a change in an applied pressure or force.

BACKGROUND OF THE INVENTION

The ability to sense changes in properties within narrow regions, such as narrow body lumens, is of increasing interest for research and diagnostic or analytical purposes. For example, the human heart pumps blood through the body and the measurement of blood pressure within blood vessels is of interest for characterising a circulatory system of a patient. Another example relates to diagnostic needs to measure a distribution of pressures exerted by muscles around the alimentary canal, which moves food from the mouth into the stomach. Further, there are many examples in other fields of technology that require measurements of properties in narrow areas, such as in water or gas pipes.

Optical devices for monitoring such properties are now being developed. The optical devices may comprise an optical fibre Bragg grating, which has an optical response that depends on a strain of the Bragg grating. The strain on the Bragg grating can be applied by a "squeezing" force in the vicinity of the Bragg grating and the resultant change in strain shifts a wavelength of an optical response to a different wavelength range. Such optical properties have the advantage that they are usually smaller than electrical or mechanical devices for measuring the change in the property. Further, an optical fibre may include a number of such Bragg gratings and each grating may be arranged to give a different optical response (for example at a different wavelength range). Consequently, it is possible to analyse a distribution of pressures.

However, such optical systems still have significant drawbacks. For example, it is often not possible, or it is inconvenient and unreliable to correct a measurement of a change in a property, such as a pressure, for differential temperature change especially if a probe of the optical system has to be very narrow.

SUMMARY OF THE INVENTION

The present invention provides in a first aspect an optical sensing apparatus for measuring a change in a first property, the apparatus comprising:
first and second optical fibre portions;
a sensing region for exposing the first and second optical fibre portions to a change in an applied force, the force being associated with the first property and having a component that is transversal to the optical fibre portions; and
a holder for holding the first and second optical fibre portions in the sensing region;
wherein the first and second optical fibre portions are arranged relative to each other such that the change in the force results in a first change of an optical property of the first optical fibre portion and in a second change of the optical property of the second optical fibre portion and wherein the first change differs from the second change.

The optical fibre portions typically are arranged relative to each other such that the change in the force results in an increase in the optical property of one of the first and second optical fibre portions and a decrease in the optical property in the other one of the first and second optical fibre portions.

The apparatus typically is also arranged for measuring a change in a second property in a manner such that the change in the second property causes either an increase of the optical property of both optical fibre portions or a decrease of the optical property of both optical fibre portions. Consequently, the optical apparatus typically is arranged such that the changes in the first and second properties result in differential mode and common mode changes of optical responses, respectively, when the first and second optical fibre portions are exposed to the first and second properties in a substantially equal manner.

The present invention provides in a second aspect an optical sensing apparatus for measuring changes in a first and a second property, the apparatus comprising:
first and second optical fibre portions,
a sensing region for exposing the first and second optical fibre portions to changes in the first and the second property; and
a holder for holding the first and second optical fibre portions in the sensing region;
wherein the apparatus is arranged such that the change in the first property results in a differential mode change in an optical property of the first and second optical fibre portions and the change in the second property results in a common mode change in the optical property of the first and second optical fibre portions.

The first and second optical fibre portions typically are arranged to experience a change in a force at the sensing region, the force being associated with the first property and having a component that is transversal to the first and second optical fibre portions.

The following introduces features that relate to embodiments of the first or second aspects of the present invention.

The first and second optical fibre portions typically are oriented along a line. The first and second optical fibre portions may be located in close proximity to each other and may be in contact at the sensing region.

In one embodiment at least one of the first and second optical fibre portions may be wound around the line and may form a helical or spiral arrangement. In one specific example each of the first and second optical fibre portions forms a helical or spiral arrangement.

In an alternative embodiment the first and second optical fibre portions are oriented substantially parallel to the line. In this case the optical fibre portions typically are positioned at the sensing region within a plane that in use is not perpendicular to the direction of the force.

The sensing region may comprise two or more regions that are spaced apart from each other.

The first property may be any suitable property, but in one specific embodiment is a force that in use is applied to a portion of the apparatus. Alternatively, the first property may be a pressure that in use is applied to a portion of the apparatus. The second property typically is a property that is applied to the first and second fibre portions in a substantially equal manner.

The apparatus may also comprise a component that is arranged to generate a force when the component is exposed to a change in the first property and that is positioned relative to the sensing region such that the force is applied to the first and second optical fibre portions. The component may be arranged to change a shape or a dimension when exposed to the first property, which may for example be a chemical property of an environment to which the component is in use exposed.

The optical sensing apparatus typically is elongated and has a width that is less than 2 mm, 1.5 mm, 1 mm or even less than 0.5 mm. The first and second optical fibre portions may have any suitable diameter, but typically have an outer diameter that has a diameter of less than 250 µm, 125 µm or even 80 µm or less.

The optical sensing apparatus may be used in a variety of different applications, such as in-vivo or in-vitro applications or may be attached to an exterior portion of a human body. For example, the optical sensing apparatus may be used to measure a blood pressure in circulatory system, measure a pressure in urological organs, may be used to monitor forces or pressures along a body limb such as a leg, or may be used to detect a chemical in any suitable environment. Further, the optical sensing apparatus may be used to measure pressures and forces in neonates and animals. The described narrow design in accordance with embodiments of the present invention facilitates the use of the optical apparatus for such applications. Further, the optical device may be used for various unrelated applications, such as measuring a pressure or another property in a water or gas pipe. Again, the narrow design in accordance with embodiments of the present invention facilitates applications in such or any other constrictive environments.

The first and second optical fibre portions may comprise at least one Bragg grating at the sensing region and may be arranged such that the change in an applied force results in respective first and second changes in tensile strain of the Bragg gratings at a sensing region. The respective changes in tensile strain effect corresponding changes in optical periods of the Bragg gratings. Consequently, the change in the applied force is detectable by detecting changes of optical responses from the Bragg gratings.

In one specific embodiment the second property is a temperature and an increase or decrease in the temperature causes a corresponding increase or decrease, respectively, of an optical period of the Bragg gratings of the first and second optical fibre portions. As the change in the first property results in a differential mode change and the change in the second property in a common mode change, it is possible to measure both properties. Further, it is possible to minimise the effect of a change in the second property on a measurement result of the first property by analysing the differential modes responses from the optical sensing apparatus.

As mentioned above, the first and second optical fibre portions typically are positioned in close proximity to each other and may be in contact with each other for example at the first and second sensing regions and typically are in contact with each other along at least a portion of their lengths. Such close proximity of the optical fibres facilitates reduction of temperature differences between the first and second sensing regions. Consequently, it is possible to reduce a differential change of the optical property of the first and second sensing region caused by a change in temperature. Further, the close proximity between the first and second optical fibres facilities a narrow design of the optical sensing apparatus which is particularly advantageous for in-vivo applications or other applications in which narrow spaces need to be probed.

The holder may be shaped to hold the first and second optical fibre portions such that the first and second optical fibre portions are wound around a line or curve along which the first and second optical fibre portions are oriented. The holder typically has an opening or recess that defines the sensing region. Further, the holder may comprise a flexible portion, such as the cantilevered portion, that is arranged to transmit the force, either directly or indirectly, to the sensing region. For example, the holder may comprise a cantilever member via which the force is applied.

The holder may be a substantially tubular member. Alternatively, the holder may be a substantially planar member. The holder may be formed from a plastics or metallic material.

The optical sensing apparatus may also comprise an outer sleeve, such as an elastic sleeve that may be removable and may have a closed distal end. The apparatus may for example comprise an outer catheter in which the optical fibre portions with the sensing region and the holder are positioned.

In an alternative variation the apparatus comprises a base portion on or over which the holder is positioned. The apparatus may further comprise a cover portion that together with the base portion surrounds portions of the apparatus.

The cover portion comprises the above-mentioned component. The base portion and the cover portion may be formed from a flexible material. In one embodiment the apparatus has a generally flat cross-sectional shape.

The sensing region may be one of a plurality of sensing regions and the holder may be one of a plurality of holders. The apparatus may be arranged such that the first and the second properties can be measured at a plurality of positions along the first and second optical fibres.

The first and second optical fibre portions may be portions of the same optical fibre (which may or may not comprise portions that are spliced together) or may be portions of separate optical fibres. Further, each of the first and second optical fibre portions may be a plurality of optical fibre potions.

Each holder may be provided in the form of a rigid member that is rigidly attached at a respective sensing region. Each holder may be arranged such that a strain in the sensing region is not directly influenced by a change in strain of the optical fibre outside that sensing region, which may be of arbitrary direction such as along the sensing regions or transversal to the sensing regions. It is consequently possible to measure a change in the first property and typically also the second property at a plurality of sensing regions and thereby measure a change in a spatial distribution of the first property.

The optical sensing apparatus may comprise flexible portions that couple adjacent holders together.

In one specific embodiment the rigid member is provided in the form of the holder that is shaped to hold the first and second optical fibre portions. The present invention provides in a third aspect a method of measuring first and second properties using an optical sensing apparatus, the method comprising:

directing an optical signal to at least two optical fibre portions at a sensing region of an optical sensing apparatus;

exposing the at least two optical fibre portions to a change in the first and second properties;

receiving at least one optical response from each optical fibre portion;

identifying a differential mode signal from the received optical response signals;

identifying a common mode signal associated with a change in a second property; and analysing the differential mode and the common mode signals to identify the change in the first and second properties, respectively.

The method typically also comprises the steps of identifying a common mode signal associated with a change in a second property; and analysing the common mode signal to identify the change in the second property.

The optical sensing apparatus typically is in accordance with the first or second aspect of the present invention The invention will be more fully understood from the following description of specific embodiments of the invention. The description is provided with reference to the accompanying drawings.

DETAILED DESCRIPTION OF SPECIFIC EMBODIMENTS

Figure 1:
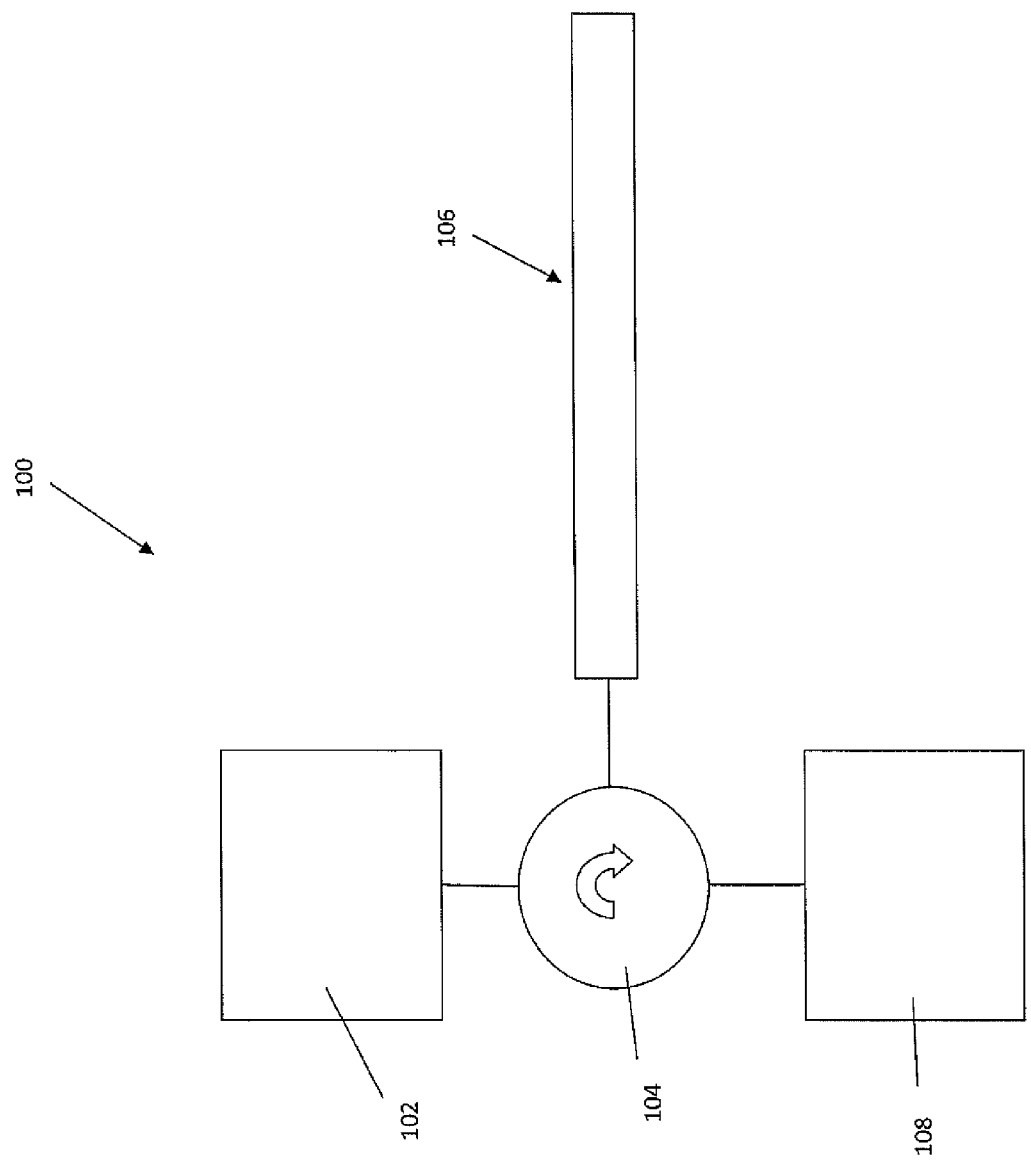
FIG. 1 shows a system for measuring a first property in accordance with a specific embodiment of the present invention.

Referring initially to FIG. 1, a system for measuring a first property is now described. In the described embodiment the first property is a pressure. However, it is to be appreciated by a person skilled in the art that the apparatus may alternatively be arranged for sensing other properties such as a force that may for example be associated with a chemical or biochemical reaction initiated in the proximity of the system.

The system 100 comprises a light source 102 which in this embodiment is a broadband light source commonly referred to as a "white" light source even though the light that is emitted by the light source 102 may have any wavelength range. The light is directed via optical circulator 104 to an apparatus for pressure sensing 106. In a variation of this embodiment the circulator 104 may be replaced by an optical coupler, an optical splitter or an optical beam splitter. The system 100 further comprises an optical analyser 108 for analysing an optical response signal from the apparatus 106.

The apparatus 106 is in this embodiment arranged for in-vivo pressure measurements and comprises a catheter (not shown) that is formed from a biocompatible material. Further, the apparatus 106 typically comprises an X-ray opaque material or series of x-ray opaque elements, such as a metallic material, for locating the apparatus 106 in the human body.

The apparatus 106 has a relatively narrow shape and has a diameter of less and 2 or even less than 1 millimeter. The narrow shape facilitates use of the apparatus 106 for in-vivo applications or other applications in which a narrow probe diameter is of importance. Such other applications include for example characterizing properties of the human vascular system, the lymphatic system, the distal sections of the human lungs, the intracranial volume, or within the human urological organs. The sensing apparatus 106 when formed into a catheter could be placed into the human alimentary canal via nose, another natural bodily orifice, or via a stoma, or placed into the vascular system via a percutaneous cannula. A person skilled in the art will appreciate that similar applications in various other fields of technology are possible, such as monitoring of utility assets or civil engineering structures.

The apparatus 106 comprises two optical fibres that each have a series of Bragg gratings (not shown). The apparatus has a series of sensing regions at which the Bragg gratings are positioned and which are sensitive to local changes in external pressure. The optical fibers of the apparatus 106 are positioned such that a change in external pressure results in a change in a transversal force on the sensing regions, which in turn causes a change in strain in the Bragg gratings of the sensing regions. The change in strain is detectable by detecting an optical response using the optical analyser 108. The optical fibers of the apparatus 106 are positioned relative to each other such that a change in external pressure at the sensing regions results in a differential mode signal change and a change in strain caused by a change in temperature results in a common mode signal change, which will be described in further detail with reference to FIG. 2.

It will be appreciated that the system 100 may comprise a number of apparatus 106 an each apparatus 106 may also comprise more than two optical fibers.

Figure 2:
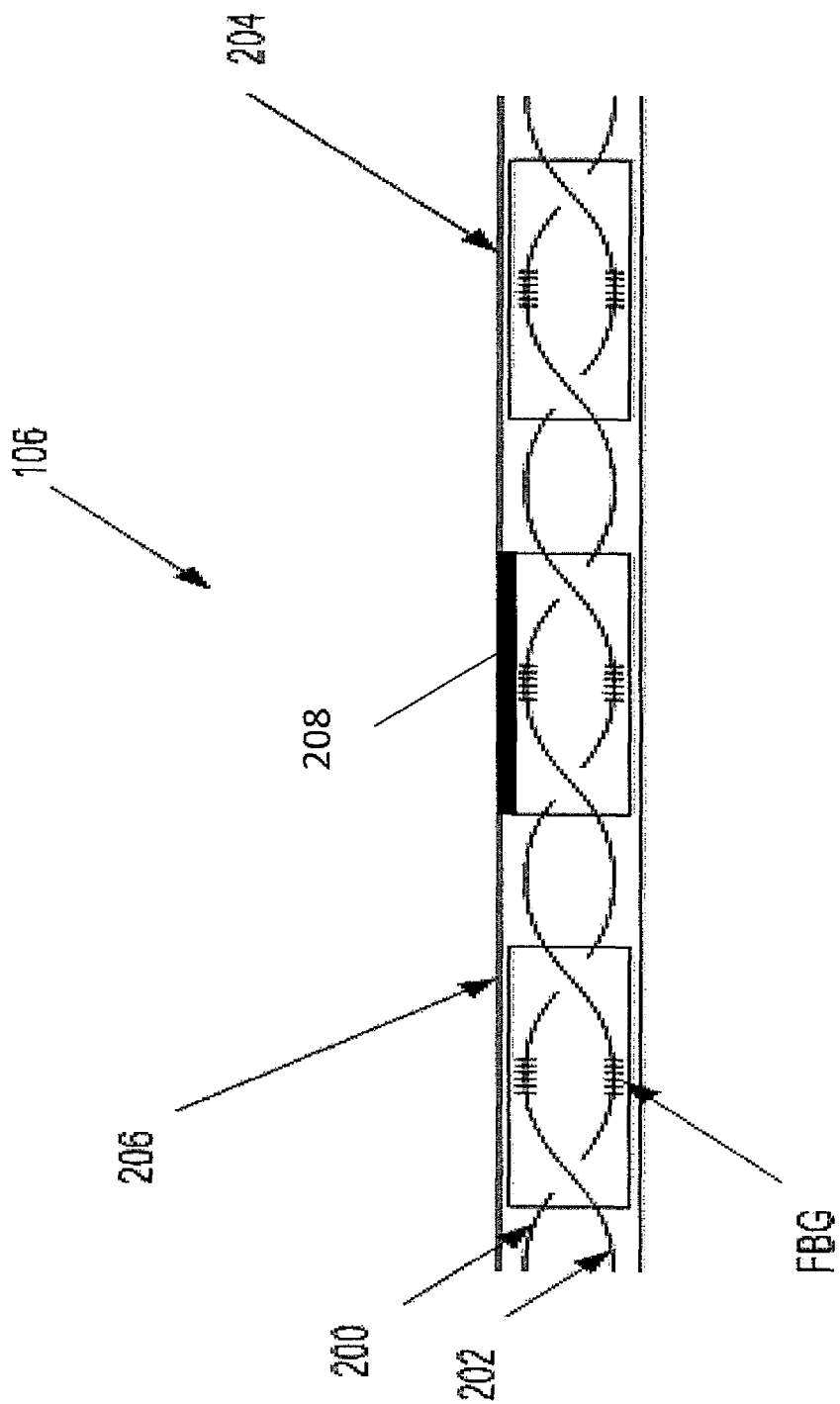
FIG. 2 shows an optical sensing apparatus according to an embodiment of the present invention.

FIG. 2 shows the optical sensing apparatus 106 with optical fibres 200 and 202. The optical fibre portions 200 and 202 are oriented along a line and are wound around the line such that a double helical structure is formed. The optical fibers 200 and 202 each comprise a series of Bragg gratings (FBGs) and the optical fibers 200 and 202 are located such that the FBGs are in a specific orientation to the direction of applied force, so as to maximize the response of the sensing regions to a given applied signal. The Bragg gratings are positioned in sensing regions of the optical fibers 200 and 202 and consequently the optical sensing apparatus 106 has a series of sensing regions at cross points of the optical fibers 200 and 202.

The apparatus 106 comprises a series of holders 204 that hold the optical fibers 200 and 202 in the double helical configuration. Further, the holders 204 have windows and/or flexible portions that define the sensing regions and are arranged for receiving external forces associated with external pressures. The optical fibers 200 and 202 with the holders 204 are positioned in a tube 206, which in this embodiment is provided in the form of a catheter. The optical sensing apparatus 106 is in this embodiment arranged for in-vivo pressure measurement.

If an external force applied to the sensing regions, having a component that is transversal to the axis of the helix, at the holders 204 of the optical sensing apparatus 106 changes, the optical fibers 200 and 202 will experience a deflection in a direction transversal to the axis. The holder 204 is arranged to constrain the fibre portions 200 and 202 from moving in other directions. This deflection results in an increase in tensile strain in one of the Bragg gratings and a reciprocal change in tensile strain in the other one of the Brag gratings.

Consequently, an optical period of the Bragg gratings of the optical fibers 200 and 202 will increase for one of the Bragg gratings and decrease for the other one of the Bragg gratings. It follows that a difference between the optical responses from both Bragg gratings is indicative of the change in external force.

The apparatus 106 may be subjected to changes in temperature. For example, if the apparatus 106 is used in an in-vivo application, a pressure associated with transportation of a liquid or bolus may be measured and the liquid or bolus may locally change the temperature of the apparatus 106. The Bragg gratings of the optical fibres 200 and 202 are in this embodiment in intimate contact and both Bragg gratings of each sensing will consequently experience substantially the same change in temperature, at substantially the same rate. The change in temperature will cause the refractive index and the strains in both Bragg gratings to change in the same manner and consequently will result in a common mode change in the optical response signals from the apparatus 106. Consequently, it is possible to distinguish the effect of a change in pressure on an optical response from the effect of a change in temperature on the optical response. It follows that the changes in temperature and the pressure can both be measured.

The Bragg gratings of the optical fibers 200 and 202 have in this embodiment slightly different optical periods such that it is possible to associate an optical response with a particular Bragg grating. Consequently, it is possible to measure a distribution of pressure changes. Alternatively, the Bragg gratings of the optical fibers 200 and 202 may have substantially identical optical periods and spatial distribution of the origin of optical responses may be derived by de-multiplexing time division multiplexed or Fourier encoded optical signals.

In order to ensure that the change in strain at the location of one of the sensing regions is not influenced by a change in strain at another one of the sensing regions, the holders 204 are rigid elements and the optical fibers 200 and 202 are rigidly attached at either side of each sensing region (and consequently at either side of each Bragg grating) to the holders 204.

In this embodiment the apparatus 106 also comprises a component 208 that is arranged to change its shape when exposed to a predetermined chemical environment. For example, the component 208 may comprise a hydrogel or polymer that deforms, swells, or otherwise changes its shape or volume when exposed to the predetermined chemical condition. The component 208 is positioned such that the change in shape or volume results in a change in force applied to the optical fibres 200 and 202. A person skilled in the art will appreciate that various materials are known that change a shape or volume when exposed to chemical conditions. A variation of the component 208 will also be described in further detail with reference to FIG. 6.

It will be appreciated that the apparatus 106 shown in FIG. 2 illustrates only one possible embodiment of the present invention. For example, in variations of the described embodiment the optical fibers 200 and 202 may not be in intimate contact or may be separated by their respective protective coatings. In addition, the apparatus 106 may not necessarily comprise a catheter that is formed by a bio-compatible material. The optical sensing apparatus 106 may alternatively for example comprise another type of protective tubing or may be embedded in a plane or sheet material, such as a wing of an airplane or another structure in or at which monitoring of pressures is of interest. Further, the apparatus 106 may be used to measure pressures, temperatures and detect chemicals in various other environments such as such in a waste water pipe. In addition, the optical fibers 200 and 202 may not necessarily form a double helical arrangement. For example, the optical fibers 200 and 202 may form a (double) spiral-shaped arrangement, or any other arrangement in which a change in an applied transversal force results in a differential mode change in strain of the Bragg gratings of the optical fibers. For example, the optical fibres may be parallel and oriented along a line and within a plane that is not perpendicular to the direction of the transversal force.

Figure 3:
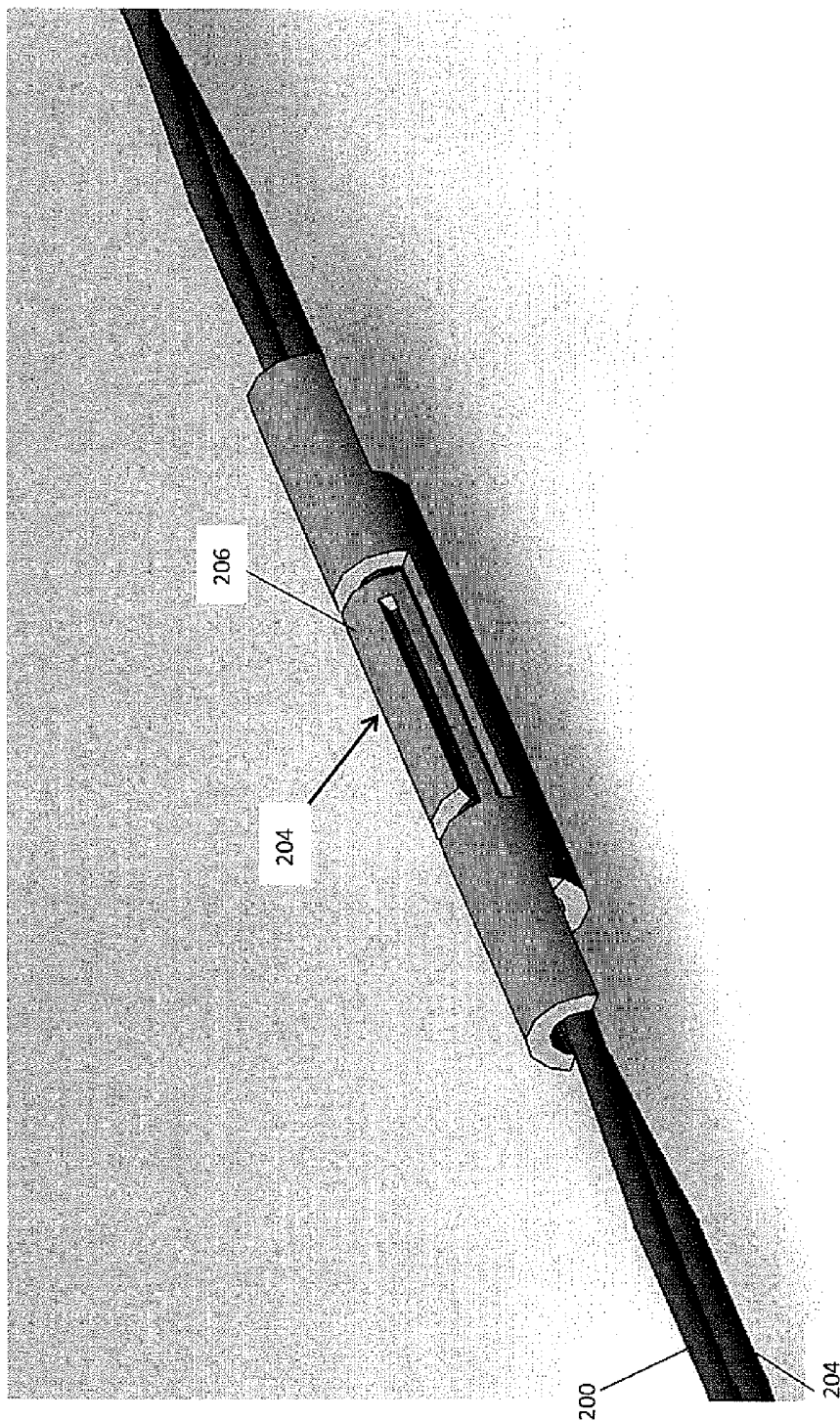
FIGS. 3 to 7 show components of an optical sensing apparatus in accordance with specific embodiments of the present invention.
Figure 4:
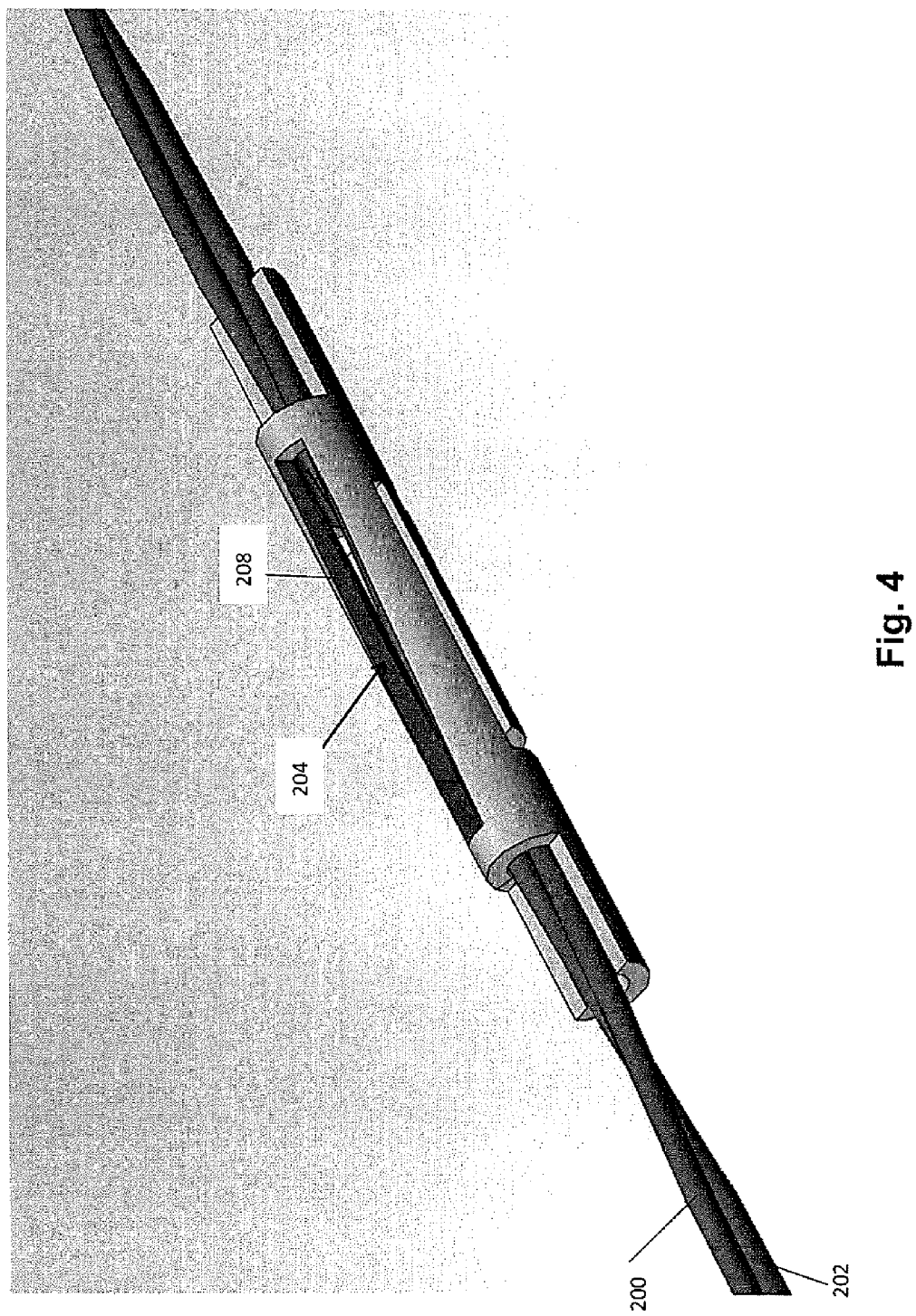
Figure 5:
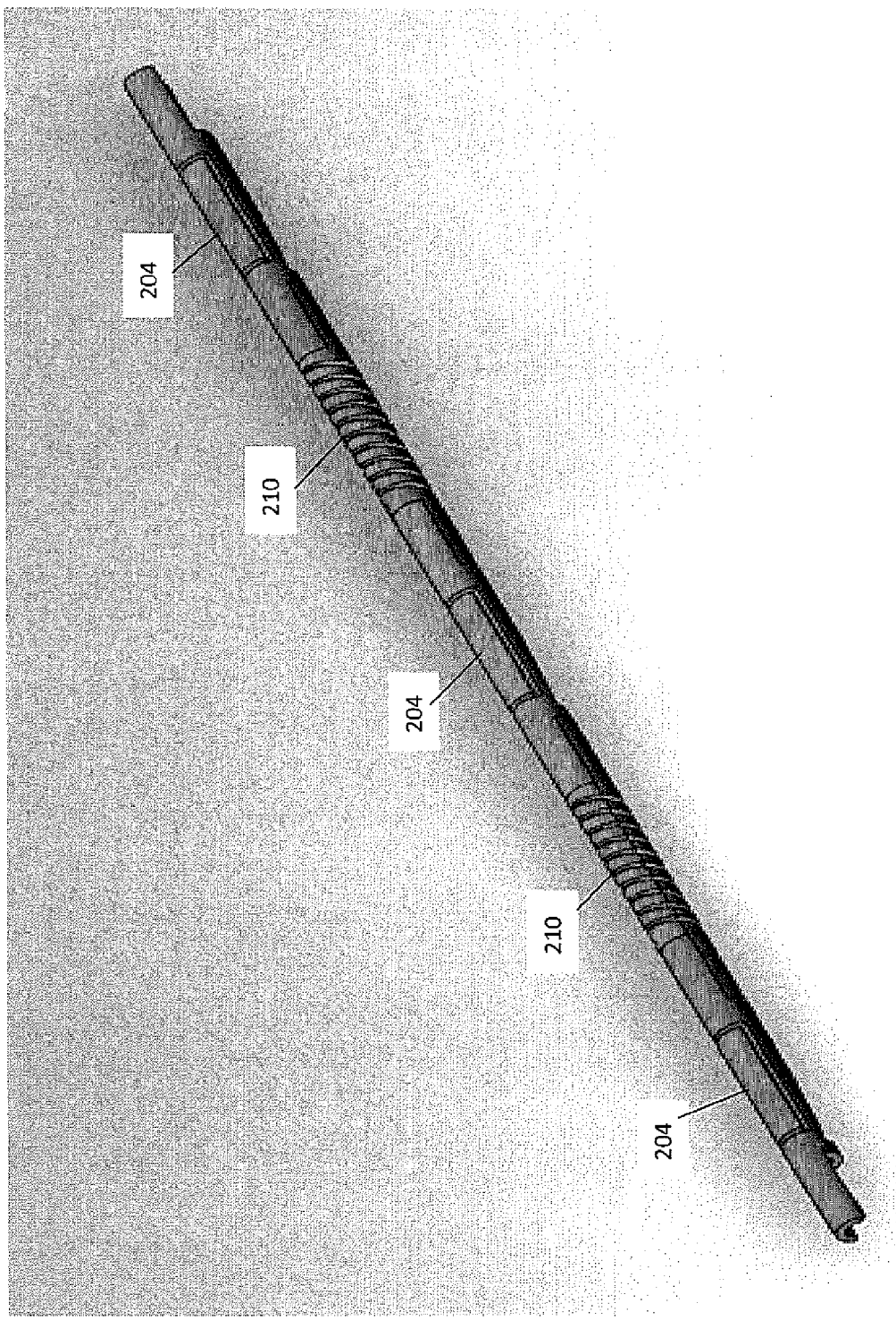

Referring now to FIGS. 3 to 5 components of the apparatus 106 are described in further detail. FIGS. 3 and 4 show the optical fibers 200 and 202 and the holder 204. FIG. 3 shows a top portion of the holder 204 and FIG. 4 shows a bottom portion of the holder 204. The holder 204 holds the optical fibers 200 and 202 in the discussed double helical arrangement, which is visible in FIGS. 3 and 4. The holder 204 has an inner portion that is arranged to guide the optical fibers 200 and 202 in the double helical arrangement through the holder 204 when the optical fibers 200 and 202 are inserted in the holder 204 for manufacturing of the apparatus 106.

The holder 204 is in this embodiment formed from a plastics or metallic material and comprises a flexible top portion 206. The flexible top portion is a cantilever-like arrangement and positioned near the sensing regions of the optical fibers 200 and 202. When an external transversal force that is applied to the flexible top portion 206 increases, the flexible portion 206 will be deflected inwardly and will cause a corresponding movement of portions of the optical fibers 200 and 202 in the sensing region. The holder 204 has an open bottom portion 208 to enable a relatively large amplitude of the deflection. Consequently, the portions of the optical fibers 200 and 202 can be deflected transversely.

It is to be appreciated that the holder 204 may take many different forms. For example, the holder 204 may not necessarily have a flexible top portion 206 and may instead comprise a membrane or the sensing region may be exposed to the external force only via a protective tubing, such as the tubing 206.

FIG. 5 shows further components of the apparatus 106. The components shown in FIG. 5 comprises three of the holders 204 which are arranged to hold the optical fibers 200 and 202 in the described double helical arrangement. Further, FIG. 5 shows two flexible elements 210 that couple together adjacent holders 204. The flexible elements 210 are in this embodiment also formed from a plastics material, but may alternatively be formed from another suitable material such as a suitable metallic material. In this example, the flexible elements 210 comprise spiral-shaped portions which are responsible for providing the flexibility of the flexible elements 210. The holders 204 and the flexible elements 210 have couplings at end portions, such as clip-like elements that each couples an end of one of the holders 204 to an end of one of the flexible elements 210. An apparatus 106 having the holders 204 and the flexible elements 210 consequently offers flexibility in a transversal direction and at the same time some rigidity in a longitudinal direction which facilitates insertion of the apparatus 106 into a body lumen. Further, the optical fibers 200 and 202 are protected from external impacts.

Figure 6:
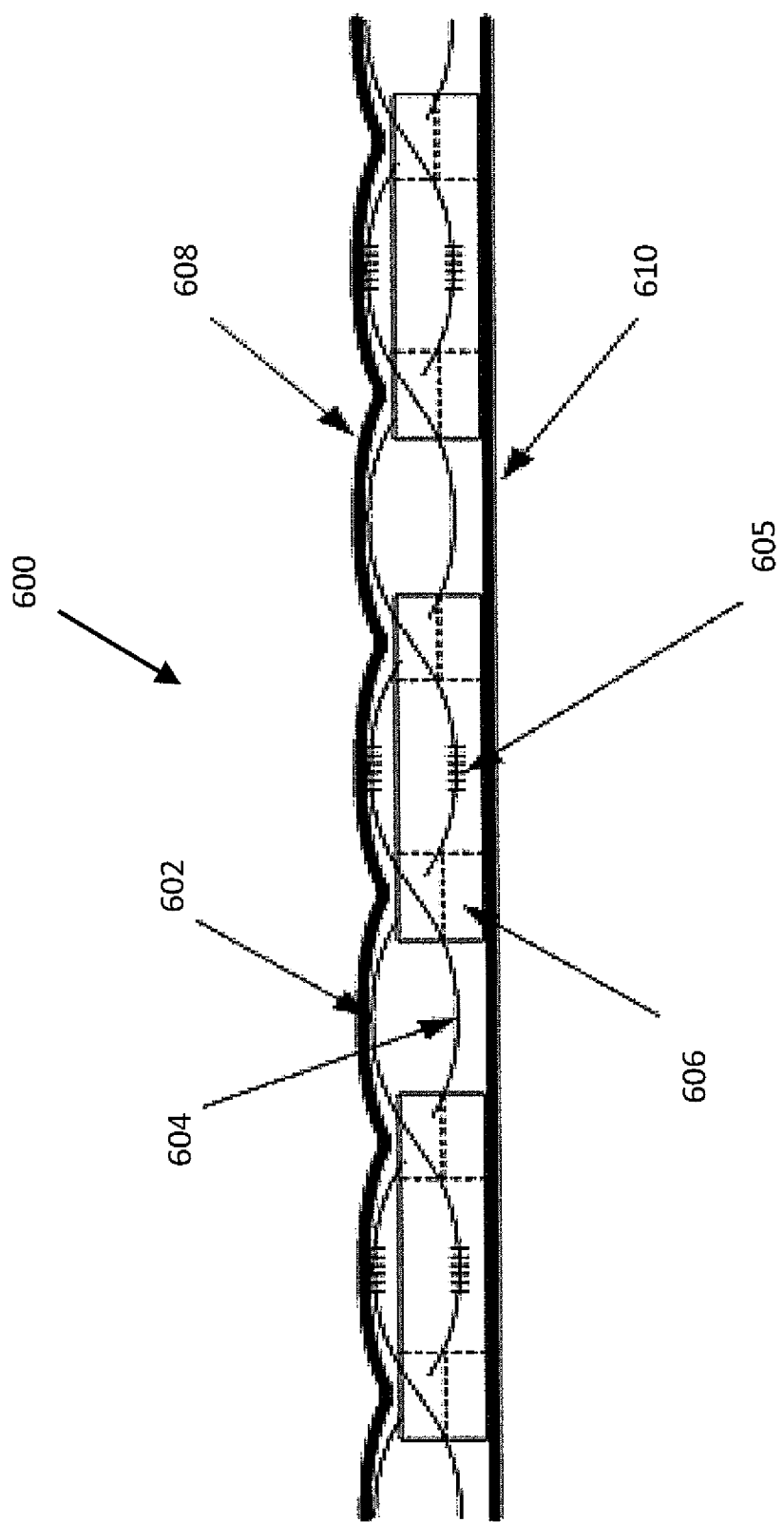
Figure 7:
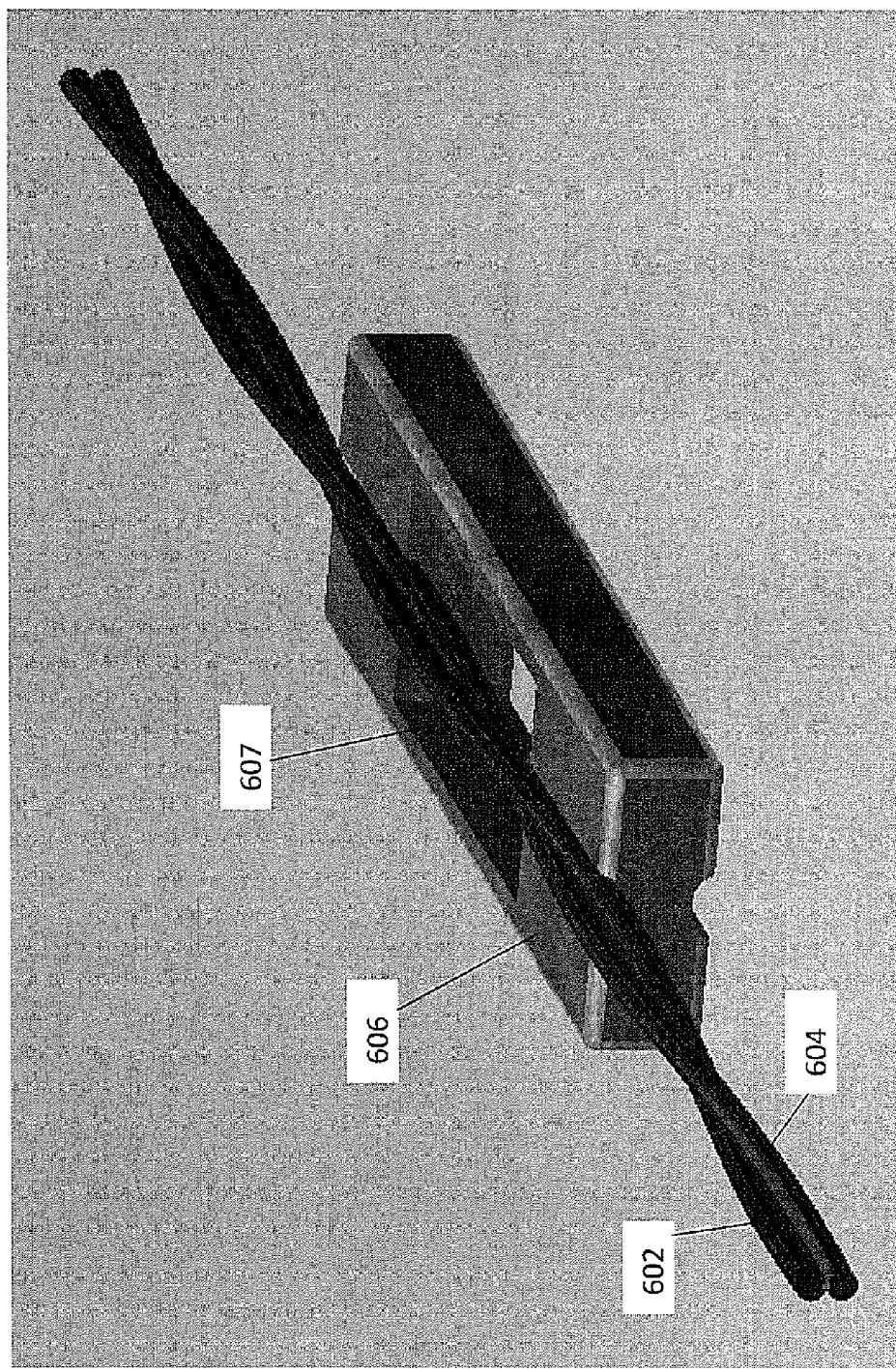

Referring now to FIGS. 6 and 7, an optical sensing apparatus 600 in accordance with a further specific embodiment is now described. FIG. 6 shows a schematic cross-sectional representation of the apparatus 600 and FIG. 7 shows a perspective view of components of the apparatus 600.

The apparatus 600 comprises optical fibres 602 and 604, which are wound around each other such that a double helical arrangement is formed. The optical fibres 602 and 604 include Bragg gratings 605 that are positioned at sensing regions defined by a recess 607 of holder 606. The holder 606 is arranged to hold the optical fibres 602 and 604 in the double helical arrangement. The apparatus 600 also comprises a flexible sheath that surrounds the optical fibres 602, 604 and the holder 606. The apparatus 600 has in this variation a flat cross-sectional shape in a transversal direction of the apparatus and perpendicular to the plane of the drawing of FIG. 6. The apparatus 600 may for example be arranged for positioning at a body portion, such as a limb of a patient. The apparatus 600 may be arranged for measuring a force or pressure distribution along the limb. The sensing apparatus 600 when formed into a substantially flat cross-sectional shape could also be placed underneath a compression garment or bandage, or under an orthopaedic cast. A person skilled in the art will appreciate that similar applications in various outer fields of technology are possible, such as monitoring of utility assets or civil engineering structures The flexible sheath 600 comprises an upper portion 608 ("upper tape") and a lower portion 610 ("lower tape"). For example, the upper portion 608 may be provided in the form of a cloth or polymer tape that may be adhesive and stretchable. Further, the upper portion 608 may also comprise silicone, an elastomeric material or metallic material.

The lower portion 610 may be formed from the same material as the upper portion 608 or may alternatively be provided in the form a rigid element (dependent on an envisaged application). The rigid element may also comprise the holders 606.

The holder 606 is formed from a stainless steel material, but may alternatively also be formed from another suitable material, such as a suitable polymeric material. In the embodiment shown in FIG. 7 the holder is a planer element and has a recess (through hole) 607 that defines the sensing region. In another variation the holder 606 may also comprise a cantilever or other suitable arrangement that protects the optical fibres in the sensing region (similar to the holder 204 shown in FIG. 3).

In one embodiment of the apparatus 600 the upper portion 608 and/or the lower portion 610 are formed form a porous material and the apparatus 600 functions as a force sensor sensing forces at the locations of the sensing regions. Alternatively, the upper portion 608 and the lower portion 610 may not be porous and the apparatus 600 may be arranged to function as a pressure sensor for sensing a pressure within a fluid or a gaseous environment.

In another variation the apparatus 600 may be arranged for measuring a property other than a force or a pressure, such as a chemical or biochemical property. For example, the upper portion 608 may comprise a material (such as a hydrogel or suitable polymeric material) that deforms, swells, or changes its shape or volume or strain in the presence of a parameter to be measured.

In one specific example the upper portion 608 comprises silicone, which is known to swell when exposed to ethanol. The apparatus 600 is in this example arranged that the swelling of the silicone in the upper portion 608 causes a change in a force on the optical fibres 602 and 604 at the sensing regions, which results in a change in optical path lengths of the Bragg gratings. Consequently, the apparatus 600 functions in this specific embodiment as a detector for ethanol.

The apparatus 600 may also comprise a further component (not shown), such as a band that may surround the optical fibres 602 and 604 and is arranged such that swelling of the further component changes a force on the Bragg grating when the further component is exposed to a suitable change in the environmental condition. The further component may be positioned in or at the upper portion 608 and may comprise a solid (rigid) material such as a bimorph material that changes its shape when exposed to the environmental condition and is positioned such that the change in shape causes a change in a force applied to the optical fibre portions at the sensing regions.

The apparatus 600 has a normal state at which the apparatus is not exposed to the environmental condition or at which the apparatus 600 is exposed to a predetermined normal environmental condition. The apparatus 600 is in this embodiment arranged such that a force is applied to the optical fibre portions 602 and 604 at the sensing regions also in the normal condition, which has the advantage that bi-directional measurement rather than unidirectional measurement are possible. For example, the apparatus 600 may be arranged to measure both acid and alkaline conditions using a material that reacts monotonically with increasing pH if the Bragg gratings were in slight tension at a pH of the order of 7. A person skilled in the art will appreciate that various other variations are possible.

Although the invention has been described with reference to particular examples, it will be appreciated by those skilled in the art that the invention may be embodied in many other forms.

The invention claimed is:

1. An optical sensing apparatus for measuring changes in pressure or force, the optical sensing apparatus comprising:
   first and second optical fibre portions with Bragg gratings;
   a sensing region for exposing both the first and second optical fibre portions with the Bragg gratings to changes in the pressure or force and in temperature; and
   a holder for holding the first and second optical fibre portions within the sensing region, the holder being provided in the form of a rigid member that is rigidly attached to the optical fibre portions at either side of the sensing region and the Bragg gratings;
   wherein, within the sensing region, the first and second optical fibre portions are arranged relative to each other such that the change in the force or pressure results in an increase in the optical property of one of the first and second optical fibre portions and a decrease in the optical property in the other one of the first and second optical fibre portions;
   wherein the apparatus is also arranged for measuring a change in temperature in a manner such that the change in temperature causes either an increase of the optical property of both optical fibre portions or a decrease of the optical property of both optical fibre portions;
   wherein the first and second optical fibre portions are oriented along a line; and
   wherein at least one of the first and second optical fibre portions is wound around the line at the sensing region.

2. The optical sensing apparatus of claim 1 wherein the force or pressure has a component that is transversal to the first and second optical fibre portions.

3. The optical sensing apparatus of claim 1 wherein the first and second optical fibre portions are in contact with each other at the sensing region.

4. The optical sensing apparatus of claim 1 wherein the first and second optical fibre portions are oriented substantially parallel to the line and are positioned at the sensing region within a plane that in use is not perpendicular to the direction of the force.

5. The optical sensing apparatus of claim 1 comprising a component that is arranged to generate a force when a portion of the component is exposed to a change in the pressure or force and that is positioned relative to the sensing region such that the force is applied to the first and second optical fibre portions.

6. The optical sensing apparatus of claim 5 wherein the component is arranged to change a shape or a dimension when exposed to the pressure or force.

7. The optical sensing apparatus of claim 1 wherein the first and second optical fibre portions are arranged such that the change in an applied force or pressure results in respective first and second changes in tensile strain of the Bragg gratings at the sensing region.

8. The optical sensing apparatus of claim 1 wherein the holder comprises a cantilever member via which the force or pressure is applied.

9. The optical sensing apparatus of claim 1 wherein the holder is a substantially tubular member.

10. The optical sensing apparatus of claim 1 wherein the holder is a substantially planar member.

11. An optical sensing apparatus for measuring changes in pressure or force, the optical sensing apparatus comprising:
first and second optical fibre portions with Bragg gratings;
a sensing region for exposing both the first and second optical fibre portions with the Bragg gratings to changes in the pressure or force and in temperature; and
a holder for holding the first and second optical fibre portions within the sensing region, the holder being provided in the form of a rigid member that is rigidly attached to the optical fibre portions at either side of the sensing region and the Bragg gratings;
wherein, within the sensing region, the first and second optical fibre portions are arranged relative to each other such that the change in the force or pressure results in an increase in the optical property of one of the first and second optical fibre portions and a decrease in the optical property in the other one of the first and second optical fibre portions;
wherein the apparatus is also arranged for measuring a change in temperature in a manner such that the change in temperature causes either an increase of the optical property of both optical fibre portions or a decrease of the optical property of both optical fibre portions;
wherein at least one of the first and second optical fibre portions forms a helical or spiral arrangement.

12. The optical sensing apparatus of claim 11 wherein each of the first and second optical fibre portions forms the helical or spiral arrangement.

13. An optical sensing apparatus for measuring changes in pressure or force, the optical sensing apparatus comprising:
first and second optical fibre portions with Bragg gratings;
a sensing region for exposing both the first and second optical fibre portions with the Bragg gratings to changes in the pressure or force and in temperature; and
a holder for holding the first and second optical fibre portions within the sensing region, the holder being provided in the form of a rigid member that is rigidly attached to the optical fibre portions at either side of the sensing region and the Bragg gratings;
wherein, within the sensing region, the first and second optical fibre portions are arranged relative to each other such that the change in the force or pressure results in an increase in the optical property of one of the first and second optical fibre portions and a decrease in the optical property in the other one of the first and second optical fibre portions;
wherein the apparatus is also arranged for measuring a change in temperature in a manner such that the change in temperature causes either an increase of the optical property of both optical fibre portions or a decrease of the optical property of both optical fibre portions; and
wherein the holder is shaped to hold the first and second optical fibre portions such that the first and second optical fibre portions are wound around each other and wherein the holder has an opening or recess that defines the sensing region.

* * * * *